United States Patent
Kumano

(10) Patent No.: US 10,138,563 B2
(45) Date of Patent: Nov. 27, 2018

(54) HYDROGEN ENERGY SUPPLY SYSTEM USING OCEAN CURRENT POWER GENERATION

(71) Applicant: Japan System Planning Co., Ltd., Tokyo (JP)

(72) Inventor: Katsuyuki Kumano, Tokyo (JP)

(73) Assignee: Japan System Planning Co., Ltd., Tokyo (JP)

(*) Notice: Subject to any disclaimer, the term of this patent is extended or adjusted under 35 U.S.C. 154(b) by 373 days.

(21) Appl. No.: 14/815,976

(22) Filed: Aug. 1, 2015

(65) Prior Publication Data
US 2016/0040307 A1    Feb. 11, 2016

(30) Foreign Application Priority Data

Aug. 6, 2014 (JP) ................. 2014-160737
Apr. 17, 2015 (JP) ................. 2015-085385

(51) Int. Cl.
*C25B 9/04*     (2006.01)
*C25B 1/04*     (2006.01)
*C25B 9/18*     (2006.01)

(52) U.S. Cl.
CPC ............ *C25B 9/04* (2013.01); *C25B 1/04* (2013.01); *C25B 9/18* (2013.01); *Y02E 10/28* (2013.01);
(Continued)

(58) Field of Classification Search
CPC ...... C25B 1/02–1/12; C25B 9/04; C25B 9/18; Y02E 10/28; Y02E 10/38; Y02E 60/324; Y02E 60/364; Y02E 60/366
See application file for complete search history.

(56) References Cited

U.S. PATENT DOCUMENTS 4,850,190 A    7/1989  Pitts
7,352,074 B1   4/2008  Pas
(Continued)

FOREIGN PATENT DOCUMENTS

JP    2003-72675 A    3/2003
JP    2004-68638 A    3/2004
(Continued)

OTHER PUBLICATIONS

English Translation of Foreign Patent Document, JP2003-72675A.
(Continued)

*Primary Examiner* — Ciel P Thomas
(74) *Attorney, Agent, or Firm* — Hilde M. L. Coeckx; Apex Juris, pllc.

(57) ABSTRACT

A hydrogen energy supply system including 10 or more water wheel impeller type power generation devices that are supported to float in water by first floating bodies and generate electric power by using ocean currents; a second floating body on which a seawater electrolysis device, a hydrogen liquefaction device, and a liquid hydrogen tank are arranged; a hydrogen transporting ship that accommodates the liquid hydrogen stored in the liquid hydrogen tank and transports it by sea to land; an overland liquid hydrogen tank that stores the liquid hydrogen supplied from the hydrogen transporting ship; a small cylinder that accommodates the liquid hydrogen supplied from the overland liquid hydrogen tank; and a hydrogen transporting vehicle that transports the small cylinder to a consumer on land.

6 Claims, 15 Drawing Sheets

(52) U.S. Cl.
CPC ............. *Y02E 10/38* (2013.01); *Y02E 60/324* (2013.01); *Y02E 60/364* (2013.01); *Y02E 60/366* (2013.01)

(56) References Cited

U.S. PATENT DOCUMENTS

| | | | | |
|---|---|---|---|---|
| 2005/0274607 | A1* | 12/2005 | Kitada | C25B 1/02 204/230.2 |
| 2006/0059998 | A1* | 3/2006 | Kumano | B01J 19/087 73/861.12 |
| 2007/0108768 | A1 | 5/2007 | Dempster | |
| 2008/0047502 | A1* | 2/2008 | Morse | C25B 1/12 123/3 |
| 2008/0231053 | A1* | 9/2008 | Burtch | C25B 1/04 290/52 |
| 2009/0115190 | A1* | 5/2009 | Devine | F17C 3/025 290/44 |
| 2012/0243987 | A1* | 9/2012 | Kumano | F03B 17/067 415/229 |

FOREIGN PATENT DOCUMENTS

| | | |
|---|---|---|
| JP | 3952477 B2 | 5/2007 |
| JP | 6139594 B2 | 5/2017 |
| RU | 2405965 C1 | 12/2010 |

OTHER PUBLICATIONS

Search report for GB1513388.7, dated Feb. 5, 2016, Total of 6 pages.
Search report for IE2015/0224, Total of 5 pages.
Japanese Office Action for JP2015-085385, dated Apr. 26, 2016, Total of 7 pages.
Japanese Office Action for JP2015-065385, dated Dec. 5, 2016, Total of 14 pages.
English Translation for JP6139594, Total of 46 pages.
Written Argument for JP2015-085385, dated Jul. 11, 2016, Total of 17 pages.
Written Amendment for JP2015-085385, dated Jul. 11, 2016, Total of 17 pages.
Written Argument for JP2015-085385, dated Feb. 10, 2017, Total of 22 pages.
Written Amendment for JP2015-085385, dated Feb. 10, 2017, Total of 16 pages.
Decision to Grant a Patent for JP2015-085385, dated Mar. 22, 2017, Total of 5 pages.

* cited by examiner

HYDROGEN ENERGY SUPPLY SYSTEM USING OCEAN CURRENT POWER GENERATION

BACKGROUND OF THE INVENTION

1. Field of the Invention

The present invention relates to a hydrogen energy supply system using ocean current power generation, and more particularly to a novel and breakthrough hydrogen energy supply system using ocean current power generation that uses ocean currents to generate electric power, applies electrolysis to seawater with the use of generated electrical energy to produce hydrogen energy, and supplies the produced hydrogen energy to a consumer side as liquid hydrogen.

2. Description of the Related Art

Approximately 70% of solar energy applied to the earth falls onto the sea, and this solar energy is mainly converted into kinetic energy of ocean currents and present.

In case of generating electric power using such kinetic energy of the ocean currents, since power generation energy is proportionate to the third power of a flow velocity of ocean currents, a location with the highest flow velocity of ocean currents must be selected as a power generating location.

That is, as the power generating location, a distant sea area rather than the vicinity of land is often selected.

To transmit electrical energy generated in such a sea area to the land, a long-distance power transmission system is required, its construction costs are high, and long-distance power transmission results in considerable transmission loss of the electrical energy.

That is, in case of performing long-distance transmission of electric power generated by many (e.g., 100 to 10000) power generators in a sea area distant from land, electric power generated by each power generator must be adjusted by a frequency conversion device before transmission so that the same frequency can be provided, the electric power must be boosted to a high voltage (10000 volts to 100000 volts) to minimize the transmission loss, and a power transmission line must be newly laid to transmit the power.

In addition, it is known that the transmission loss is lowered as a transmission voltage is increased. For example, it is known that decupling the transmission voltage from 100 V to 1000 V results in reducing the transmission loss to $1/100$.

However, adoption of the above-described system leads to various kinds of non-negligible power loss, e.g., loss at the time of frequency adjustment, transmission loss due to long-distance power transmission, or loss caused when power is discarded without being consumed during the night.

Further, although storing generated electrical energy in a power accumulation equipment can be considered, a large-capacity storage battery is required, and high costs must be put in, which is not cost effective.

In patent Literature 1, proposed is a hydrogen production plant that uses natural energy of, e.g., tidal currents to generate electric power, uses this generated electric power to produce a hydrogen gas from seawater with the use of movable seawater electrolytic hydrogen production device, performs liquefaction by a hydrogen liquefaction device, stores a resultant substance as liquid hydrogen in a liquid hydrogen storage tank, and transmits the liquid hydrogen to consumers by a transporting tanker (Patent Literature 1: FIG. 3).

However, in case of the hydrogen production plant according to Patent Literature 1, when a power generator is installed below a movable berth and the liquid hydrogen production plant is placed on this berth, the number of power generators to be installed is small and electric power generation of these power generators is small with respect to entire production costs including the berth, and a floor area or the like required for the seawater electrolysis device using this generated power and liquid hydrogen production and storage is overabundant. Consequently, an increase in hydrogen gas production costs and in liquid hydrogen transmission costs is inevitable.

[Patent Literature 1] Japanese Unexamined Patent Application Publication No. 2003-72675

SUMMARY OF THE INVENTION

A problem to be solved by the present invention lies in that there has not been a hydrogen energy supply system using ocean current power generation that can efficiently convert seawater into hydrogen energy and exploit it by using electrical energy inexpensively generated in water by many power generation facilities each having a simplified configuration with the use of ocean currents without being affected by climatic changes and that is every superior in cost performance as a whole without problems of frequency conversion of the generated electric power, transmission loss, and others.

A novel and breakthrough hydrogen energy supply system using ocean current power generation according to the present invention is mainly characterized by including: a plurality of (e.g., 10 or more) water wheel impeller type power generation devices that are arranged in water of a sea area where a flow velocity of ocean currents is high, supported to float in water by a plurality of (e.g., 10 or more) first floating bodies respectively, moored at the bottom of sea through anchors respectively, and generate electric power by using ocean currents; a second floating body that floats on the sea surface of the sea area, is moored at the bottom of sea through anchors, uses each generated electric power from the 10 or more water wheel impeller type power generation devices, and has a seawater electrolysis device including electrolyzing means equal to or smaller than the 10 or more water wheel impeller type power generation devices in number that take in seawater and apply electrolysis to the seawater to generate a hydrogen gas, a hydrogen liquefaction device that converts the hydrogen gas generated by each electrolyzing means into liquid hydrogen, and a liquid hydrogen tank that stores the liquid hydrogen arranged thereon; and a hydrogen transporting ship that accommodates the liquid hydrogen stored in the liquid hydrogen tank and transports it by sea toward land, and the liquid hydrogen transported by sea by the hydrogen transporting ship is supplied to a consumer side on land.

According to claims 1 and 2, the electric energy generated with the use of ocean currents by the water wheel impeller type power generation devices as power generation facilities each having a simplified configuration can be used, the seawater can be efficiently converted into the hydrogen energy by the seawater electrolysis device and delivered to the consumer side as the liquid hydrogen, and the liquid hydrogen can be effectively exploited as a power generation hydrogen energy source using a fuel cell, a hydrogen energy source for a fuel-cell vehicle, or the like. Further, when the seawater electrolysis device including the electrolyzing means equal to the 10 or more water wheel impeller type power generation devices in number is provided, a difference between frequencies of generated power of the different water wheel impeller type power generation devices does not have to be adjusted, and a problem of transmission loss does not occur. Furthermore, even if any one of the 10 or more water wheel impeller type power generation devices fail to operate, stopping the single electrolyzing means can suffice, the influence can be suppressed, and the hydrogen energy supply system using ocean current power generation that is superior in cost performance as a whole can be realized and provided.

According to the invention defined in claim 3, in the invention according to claim 1 or 2, the 10 or more first floating bodies and the second floating body form one set and one or more sets are arranged in the sea area where a flow velocity of ocean currents is high, the 10 or more first floating body having 10 or more water wheel impeller type power generation devices installed in the sea whose area is 10 times or more larger than a surface area of the second floating body, and the second floating body having the seawater electrolysis device including the electrolyzing means, whose number is equal to that of the water wheel impeller type power generation devices or eliminates the need for frequency adjustment, the hydrogen liquefaction device that converts a generated hydrogen gas into liquid hydrogen, and the liquid hydrogen tank that collects and stores the liquid hydrogen arranged thereon. Therefore, it is possible to supply a large number of power generation hydrogen energy sources using fuel cells or hydrogen energy sources for fuel-cell vehicles. For example, when hydrogen manufacture based on electrolysis using 500 water wheel impeller type power generation devices in one location and works for liquefaction, packing, and storage are carried out on the second floating body (or on land of an adjacent island), overcall system costs can be greatly reduced.

According to the invention defined in claim 4, there is provided a configuration including: 10 or more water wheel impeller type power generation devices that are arranged in the sea of a sea area where a flow velocity of ocean currents is high, supported by 10 or more first floating bodies present to stabilize the water wheel impeller type power generation devices in water so that the water wheel impeller type power generation devices are pulled upward and float in water, moored at the bottom of sea through anchors respectively, generate electric power by using ocean currents in a state that water wheel impeller type power generation device (impeller blades and power generation units) installation units are pulled in a vertical direction and stabilized by the first floating bodies and the anchors, and arranged in the sea of a wide range, e.g., 1 k meter square; a seawater electrolysis device that fixedly floats on the sea surface of the sea area, is moored at the bottom of sea through anchors, uses generated electric power from the water wheel impeller type power generation devices, has small electrolysis cells that take in seawater and are equal to or smaller than the water wheel impeller type power generation devices in number provided therein, and applies electrolysis to the seawater to generate a hydrogen gas; a single second floating body that has a hydrogen liquefaction device which collects the generated hydrogen gas and converts it into liquid hydrogen and a liquid hydrogen tank which stores the liquid hydrogen arranged thereon and has a floor area of (a breadth) 100 M×(a length) 200 M; and a hydrogen transporting ship that accommodates the liquid hydrogen stored in the liquid hydrogen tank and transports it by sea toward land, and the liquid hydrogen transported by sea by the hydrogen transporting ship is supplied to a consumer side on land. Thus, like the invention according to claim 1, electric energy generated by the water wheel impeller type power generation devices as power generation facilities using ocean currents is utilized to efficiently convert seawater into hydrogen energy with the use of the seawater electrolysis device and supply it to a consumer side as liquid hydrogen, and the converted energy can be effectively exploited as a power generation hydrogen energy source using fuel cells, a hydrogen energy source for a fuel-cell vehicle, and the like. Moreover, when the seawater electrolysis device including the electrolyzing means equal to the 10 or more water wheel impeller type power generation devices in number is provided, a difference between frequencies of generated power of the different water wheel impeller type power generation devices does not have to be adjusted, and a problem of transmission loss does not occur. Additionally, even if any one of the 10 or more water wheel impeller type power generation devices fail to operate, stopping the single electrolyzing means can suffice, the influence can be suppressed, and the hydrogen energy supply system using ocean current power generation that is superior in cost performance as a whole can be realized and provided.

According to the invention of claim 5, in the invention according to any one of claims 1 to 4, the water wheel impeller type power generation device includes: a power generator having a speed-increasing gear disposed to a housing supported by the first floating body; a rotor supported by a rotary shaft disposed to the housing; impeller blades that are provided on an outer circumference of the rotor and receive a flow of the seawater to rotate the rotor; and power transmission unit that increases speed of power of the rotary shaft rotating with the rotor by the speed-increasing gear and transmits the power to the power generator. Thus, it is possible to realize and provide the hydrogen energy supply system using ocean current power generation that can supply electric power required for the seawater electrolysis device with the use of the water wheel impeller type power generation devices as power generation facilities each having the simplified configuration.

According to the invention of claim 6, in the invention according to any one of claims 1 to 5, the seawater electrolysis device includes a liquid activation device and a plurality of electrolyzing means, the liquid activation device including: a liquid activator including a black body radiation sintered compact and an electromagnetic wave convergence body using a magnet that allows electromagnetic waves radiated from the black body radiation sintered compact to pass while converging them to a fixed wavelength; and assemblies integrated to form a liquid activation area where a liquid is activated by the electromagnetic waves on the inner side of the electromagnetic wave convergence body while arranging the black body radiation sintered compact on the outer side and the electromagnetic wave convergence body on the inner side, a liquid portion of the seawater as an electrolyte solution being activated in the liquid activation area, and the electrolyzing means including: an electrolysis container which uses a titanium electrode or a platinum electrode as a negative electrode and uses a platinum electrode as a positive electrode and in which the seawater as the electrolyte solution is put; and a variable direct-current voltage source that applies a variable direct-current voltage to the negative electrode and the positive electrode, electrolyzing means applying electrolysis to the seawater having a liquid portion activated in the activation area to generate a hydrogen gas. Thus, it is possible to realize and provide the hydrogen energy supply system using ocean current power generation that can efficiently apply electrolysis to the seawater to generate a hydrogen gas.

According to the invention of claim 7, in the invention according to any one of claims 1 to 6, the liquid hydrogen is used as a power generation hydrogen energy source using a fuel cell of a consumer, a hydrogen energy source for a fuel-cell vehicle, or the like. Thus, it is possible to realize and provide the hydrogen energy supply system using ocean current power generation for supplying an energy source for fuel cells or fuel-cell vehicles which has been increased in recent years.

According to the invention of claim 8, on the basis of a configuration that supports one water wheel impeller type power generation device by one floating body, supports 10 or more water wheel impeller type power generation devices by 10 or more first floating bodies, and arranges seawater electrolysis devices which are equal to or smaller than the water wheel impeller type power generation devices, a hydrogen liquefaction device that converts a generated hydrogen gas into liquid hydrogen, and a liquid hydrogen tank that stores the liquid hydrogen on the floating body, it is possible to realize and provide the hydrogen energy supply system using ocean current power generation that exercises the same effect as that of the invention according to claim 1.

According to the invention of claim 9, based on the same configuration as the invention of claim 8, like the invention of claim 3, it is possible to realize and provide the hydrogen energy supply system using ocean current power generation that can supply large quantities of power generation hydrogen energy sources using fuel cells or hydrogen energy sources for fuel-cell vehicles in accordance with demands from many consumers.

According to the invention of claims 10 to 12, it is possible to realize and provide the hydrogen energy supply system using ocean current power generation that exercises the same effect as that of the invention according to claim 1 or 2, can transmit generated electric power by residual water wheel impeller type power generation devices even in case of a failure of a few water wheel impeller type power generation devices or shutdown for maintenance, can contribute to smoothing the system operation without obstructing generation of hydrogen energy, and can realize considerable simplification of the system configuration.

BRIEF DESCRIPTION OF THE DRAWINGS

FIG. 6(a) is a side elevation and FIG. 6(b) is a front view;

DETAILED DESCRIPTION OF THE PREFERRED EMBODIMENTS

To realize the purpose of providing the novel and breakthrough hydrogen energy supply system using ocean current power generation that can efficiently convert seawater into hydrogen energy and exploit it by using electric energy generated by power generation facilities having a simple configuration with the use of ocean currents and is very superior in cost performance as a whole without troubles of frequency conversion of generated electric power or transmission loss, the present invention adopts the configuration including: a plurality of water wheel impeller type power generation devices which are arranged in the sea of a sea area where a flow velocity of ocean currents is high, supported by a plurality of first floating bodies to float in the sea respectively, moored at the bottom of sea through anchors, and uses ocean currents to generate electric power; a second floating body which floats on the sea surface of the sea area, is moored at the bottom of sea through anchors, and uses generated electric power from the plurality of water wheel impeller type power generation devices, and on which seawater electrolysis devices equal to the plurality of water wheel impeller type power generation devices in number that take in seawater, and apply electrolysis to generate a hydrogen gas, a hydrogen liquefaction device that converts the hydrogen gas generated by the respective seawater electrolysis devices into liquid hydrogen, and a liquid hydrogen tank that stores the liquid hydrogen are arranged; a hydrogen transporting ship that accommodates the liquid hydrogen stored in the liquid hydrogen tank and transports it by sea toward land; an overland liquid hydrogen tank that stores the liquid hydrogen supplied from the hydrogen transporting ship; a small cylinder that accommodates the liquid hydrogen supplied from the overland liquid hydrogen tank; and a hydrogen transporting vehicle that transports this small cylinder on land to a consumer side.

EXAMPLES

A hydrogen energy supply system using ocean current power generation according to an example of the present invention will now be described hereinafter in detail with reference to the drawings.

Figure 1:
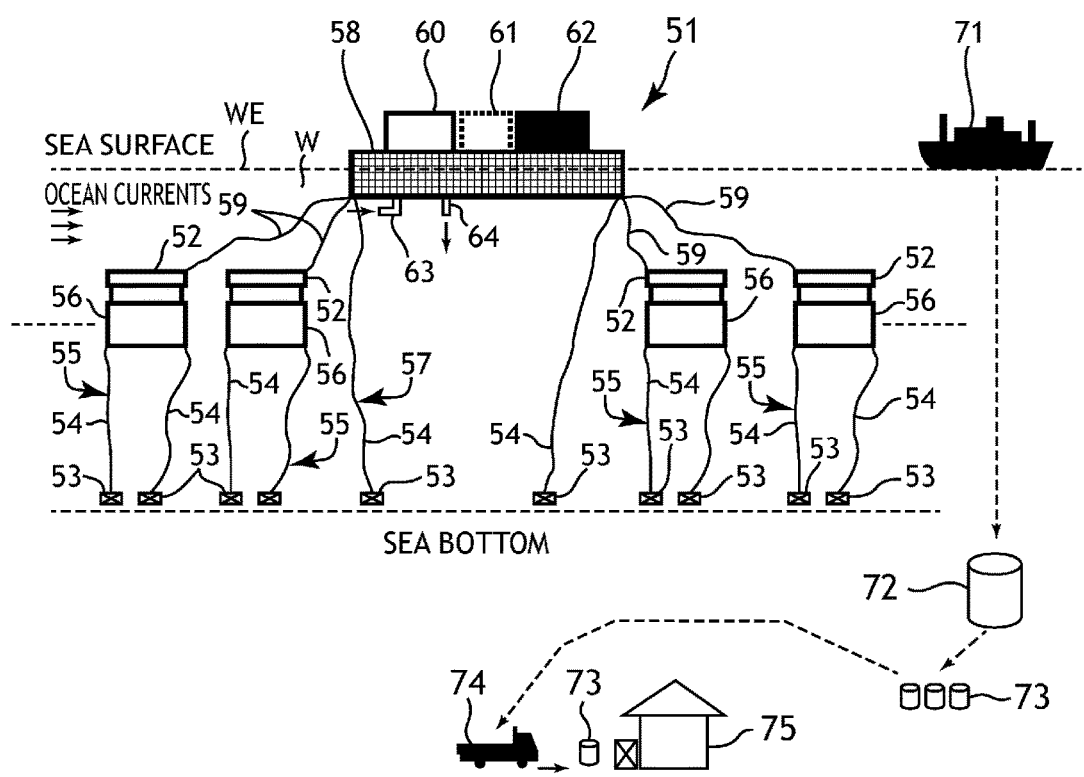
FIG. 1 is a schematic explanatory view showing an entire configuration of a hydrogen energy supply system using ocean current power generation according to an example of the present invention.

As shown in FIG. 1, a hydrogen energy supply system 51 using ocean current power generation according to this example includes: a plurality of (e.g., 10 or more) water wheel impeller type power generation devices 56 that are arranged in the sea of a sea area WE where a flow velocity of ocean currents is high, supported by a plurality of (e.g., 10 or more) first float bodies (floats) 52 respectively to float in water, moored at the bottom of sea through anchors 55 each including a cone 53 and a mooring rope 54 respectively, and use ocean currents to generate electric power; for example, a single second floating body (a mega-float) 58 that floats on the sea surface of the sea area WE and is moored at the bottom of sea through anchors 57 each including, e.g., a cone 53 and a mooring rope 54; a seawater electrolysis device 60 that is arranged on the second floating body 58, uses generated electric power transmitted from the respective water wheel impeller type power generation devices 56 through power cables 59, and includes electrolyzing means 81 that take in seawater W to apply electrolysis to the seawater W to generate a hydrogen gas, and correspond to the water wheel impeller type power generation devices 56 in a one-on-one relationship in number (or electrolyzing means 81 whose number eliminates the need for frequency adjustment); a hydrogen liquefaction device 61 that converts the generated hydrogen gas into liquid hydrogen under a low-temperature condition of, e.g., −253° C.; a liquid hydrogen tank 62 that stores the liquid hydrogen; a hydrogen transporting ship 71 that accommodates the liquid hydrogen stored in the liquid hydrogen tank 62 and transports it by sea toward land; an overland liquid hydrogen tank 72 that is arranged on the land to which the hydrogen transporting ship 71 berths and stores the liquid hydrogen supplied from the hydrogen transporting ship 71; a small cylinder 73 that accommodates the liquid hydrogen supplied from the overland liquid hydrogen tank 72; and a hydrogen transporting vehicle 74 that transports this small cylinder 73 on land to various kinds of consumers 75 in a factory, a general household, and others.

In the hydrogen energy supply system 51 using ocean current power generation according to this example, the first floating body 52, the anchor 55, and the water wheel impeller type power generation device 56 form one set, and a plurality of sets (FIG. 1 shows four sets only) in the sea of the sea area WE as shown in FIG. 1. The number of the arranged sets is not restricted in particular.

It is to be noted that FIG. 1 shows the four water wheel impeller type power generation devices 56, but practically the number of the water wheel impeller type power generation devices 56 may be set to 10 or more to be implemented, and the number of the floating bodies to be installed may be increased accordingly.

For example, many first floating bodies 52 that are present to stabilize the water wheel impeller type power generation devices 56 in water support the water wheel impeller type power generation devices 56 to be pulled upward and float in water. Further, there is an example where, in a state that each water wheel impeller type power generation device (rotary blades and a power generation unit) installation unit is moored at the bottom of sea through the anchor 55 and pulled in a vertical direction and stabilized by the first floating body 52 and the anchor 55, N sets (N is a positive integer), e.g., 500 sets are arranged in the extensive sea area WE of 1 K meters square.

Furthermore, the second floating body 58 is configured with a wide area having a dimension, e.g., a floor area (a breadth) 100 M×(a length) 200 M.

The seawater electrolysis device 60 includes an intake port 63 of seawater W and a drain port 64 of the seawater W after electrolysis as will be described later.

The water wheel impeller type power generation device 56 will now be described with reference to FIG. 2 to FIG. 6.

The water wheel impeller type power generation device 56 has a drum body 2 as a rotor whose outer periphery is formed into a dodecahedron and a side plate 3 that is fixed on both side surfaces of the drum body 2 and constitutes part of the drum body 2 arranged in a square-cylindrical housing 1, and also has a power generator 30 fixed and arranged onto the housing 1.

An outer diameter of the side plate 3 is larger than an outer diameter of the drum body 2. The side plate 3 is fixed to a rotary shaft 4 by a fixture 5. Bearings 6 are fixed to portions of the side plate 3 protruding upward from the drum body 2 in accordance with the dodecahedron, respectively.

Figure 2:
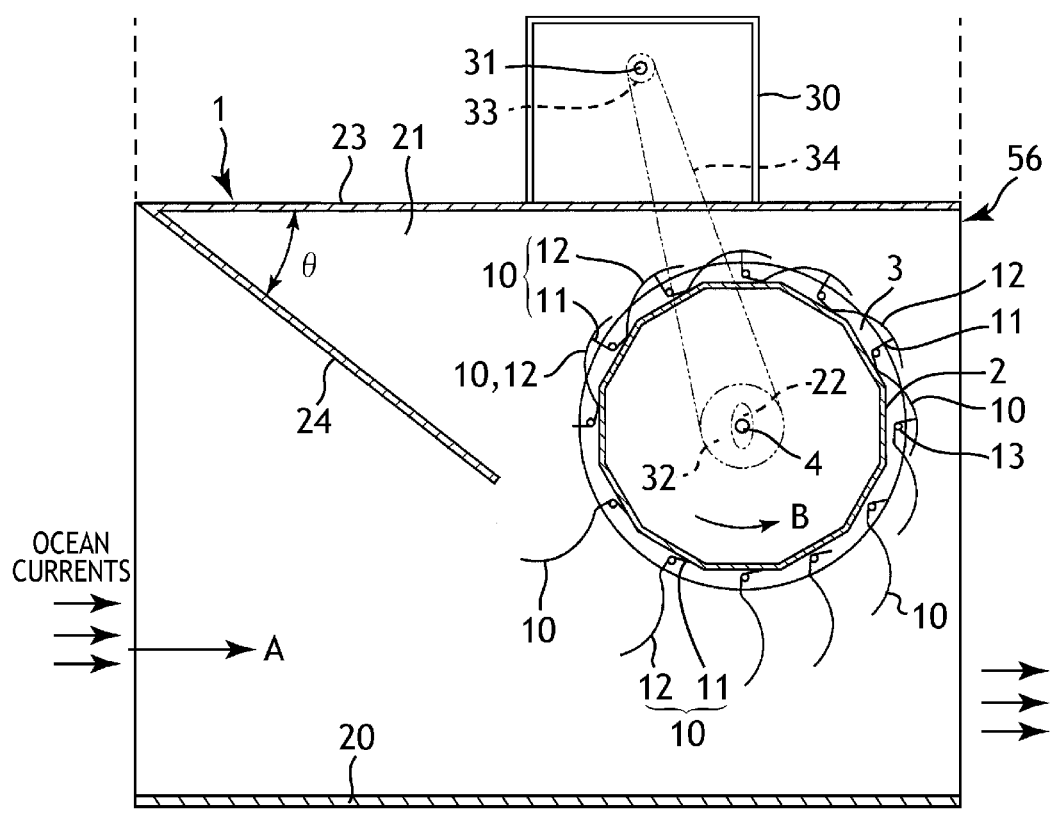
FIG. 2 is a schematic cross-sectional view of a water wheel impeller type power generation device in the hydrogen energy supply system using ocean current power generation according to the example.
Figure 6:
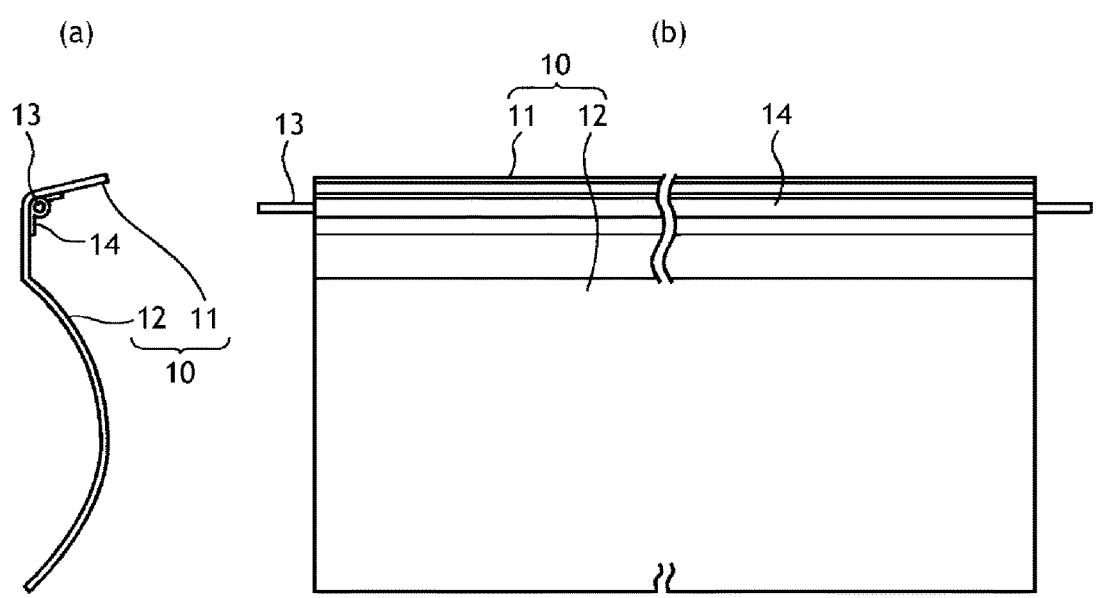
FIG. 6 shows an impeller blade of the water wheel impeller type power generation device in the hydrogen energy supply system using ocean current power generation according to the example, where

Such impeller blades 10 as shown in FIG. 2 and FIGS. 6(*a*) and (*b*) are disposed to the drum body 2. The impeller blade 10 is constituted of a stopper portion 11 having a small length and a fluid receiver portion 12 raised from this stopper portion 11, and it is fixed to a spindle 13 by a fixture 14.

Both end portions of the spindle 13 are rotatably supported by the bearings 6 arranged to face each other.

A fluid receiving surface side of the fluid receiver portion 12 is formed into an R-like recessed shape so that a larger amount of a fluid can be received when the stopper 11 comes into contact with the drum body 2 to be raised.

Moreover, as shown in FIG. 2, the fluid receiver portion 12 has a length that covers the stopper portion 11 and a lower part of the fluid receiver portion 12 of the falling impeller blade 12 when each impeller blade 10 falls.

Figure 3:
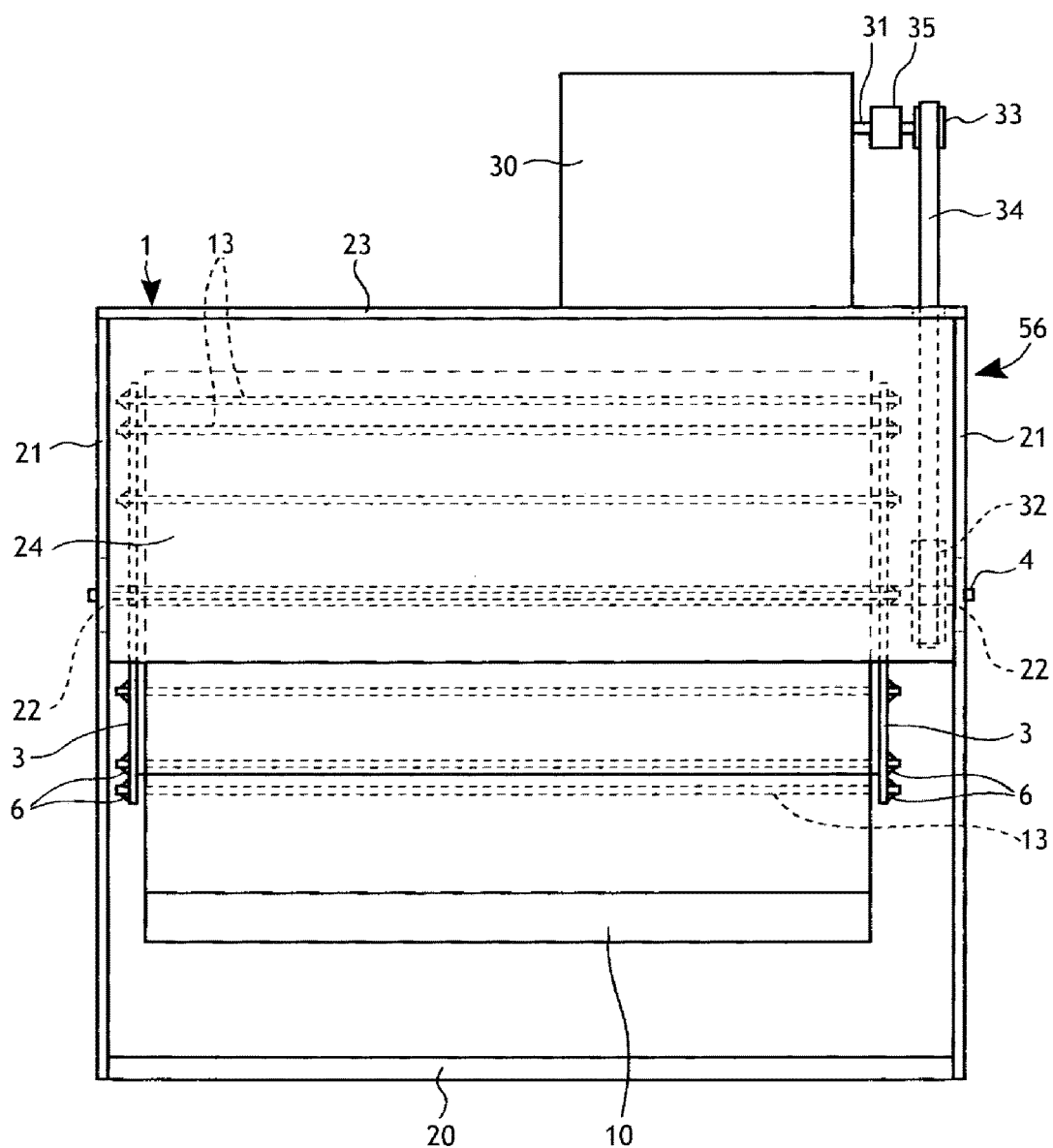
FIG. 3 is a schematic front view of the water wheel impeller type power generation device in the hydrogen energy supply system using ocean current power generation according to the example.
Figure 4:
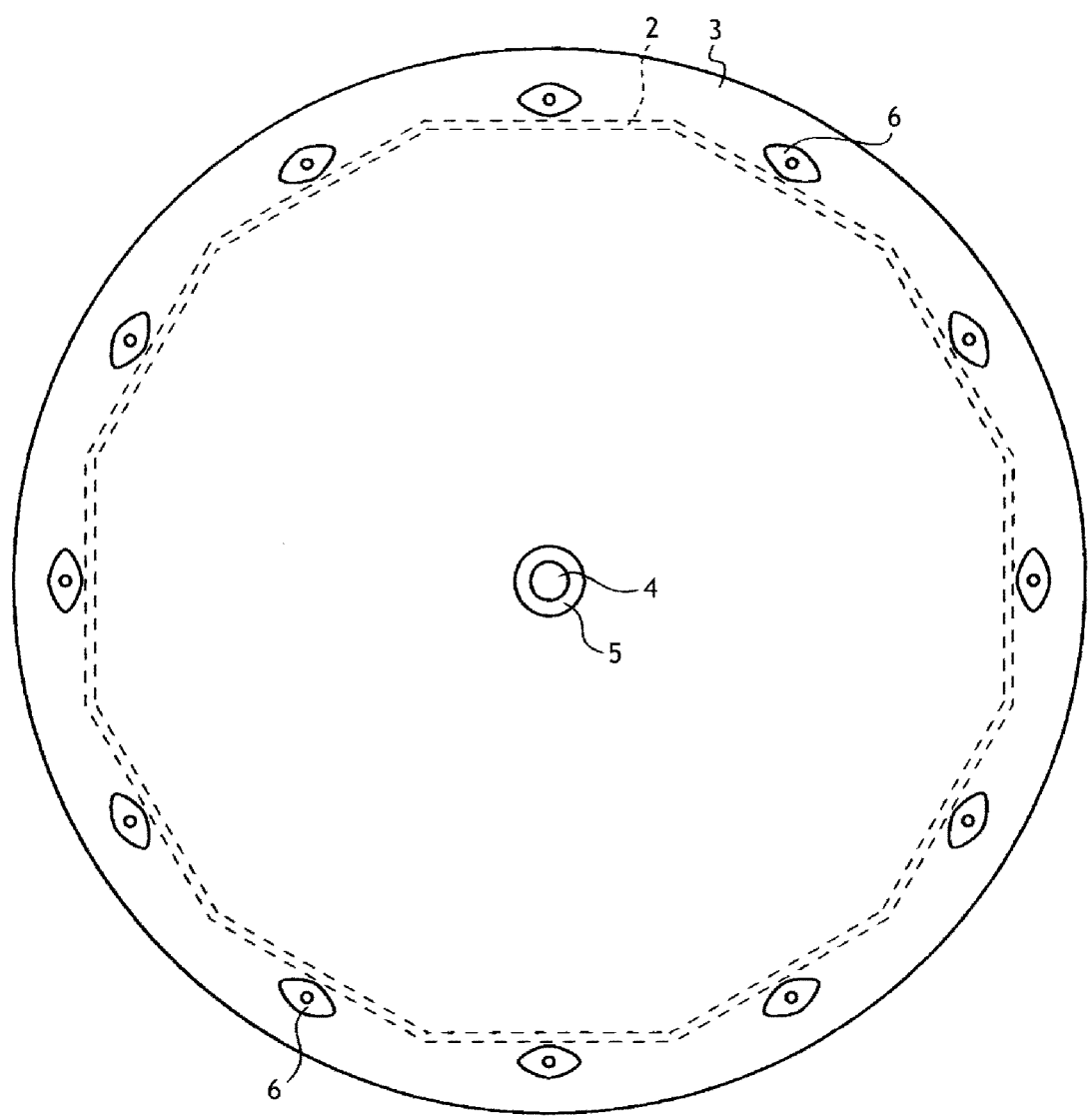
FIG. 4 is a side elevation of a drum body of the water wheel impeller type power generation device in the hydrogen energy supply system using ocean current power generation according to the example.
Figure 5:
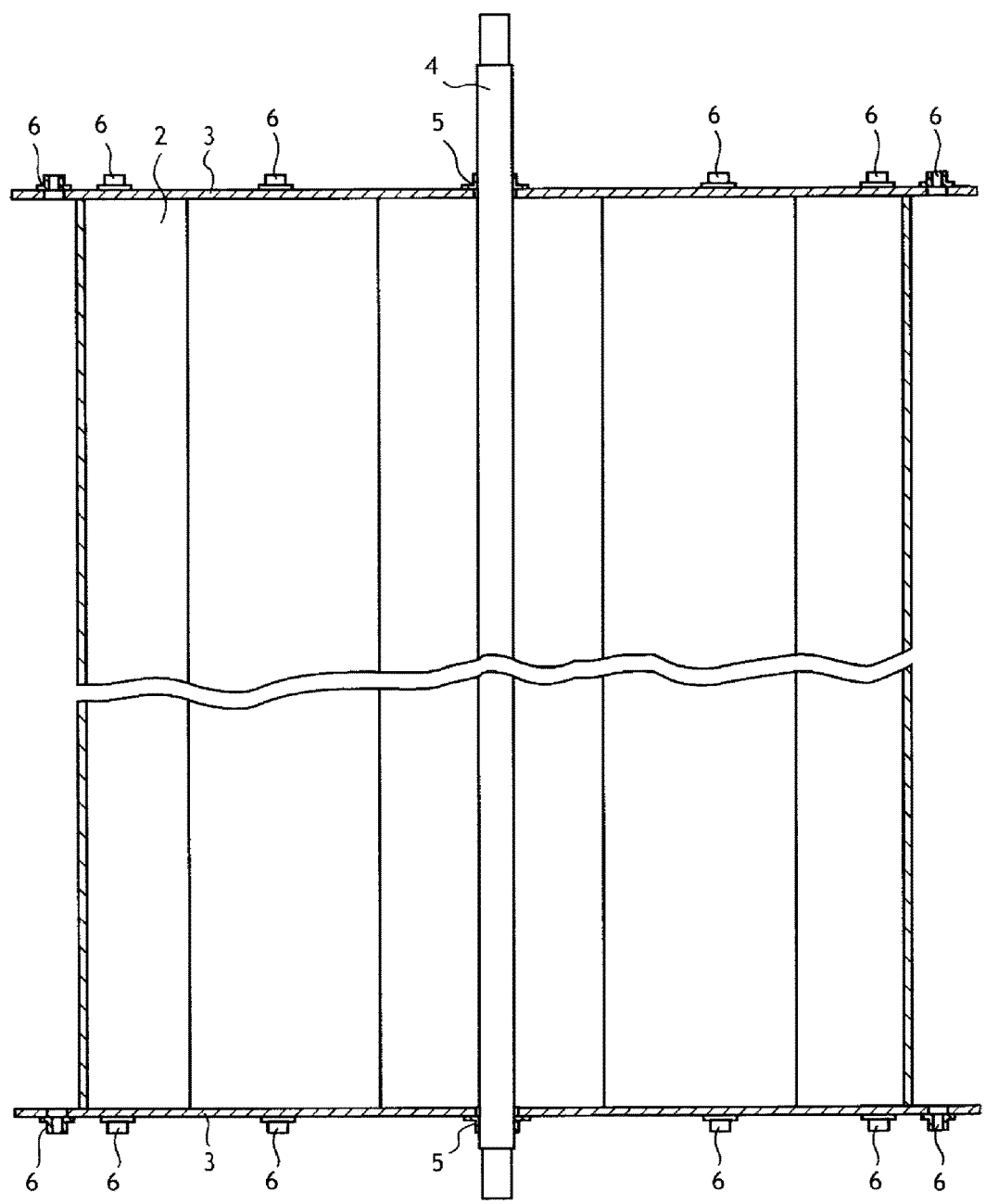
FIG. 5 is a schematic cross-sectional view of the drum body of the water wheel impeller type power generation device in the hydrogen energy supply system using ocean current power generation according to the example.

As shown in FIG. 2 and FIG. 3, the rotary shaft 4 of the drum body 2 having the impeller blades 10 disposed thereto is rotatably supported by side plates 21 fixed to both sides of a bottom plate 20 through bearings 22.

Additionally, a top panel 23 is fixed to the upper side of both the side plates 21. That is, the bottom plate 20, the side plates 21, and the top panel 23 constitute the housing 1 of the device.

A fluid guide plate 24 is fixed to a front end portion of the top panel 23 at an inward slant.

Here, the fluid guide plate 24 has a slanted length to lead ocean currents in a flow direction A to the impeller blades 10 below the rotary shaft 4.

The power generator 30 is fixed to the upper side of the top panel 23 so that an input shaft 31 of the power generator 30 becomes parallel to the rotary shaft 4.

Gears 32 and 33 are fixed to one end portion of the rotary shaft 4 and the input shaft 31, respectively, and a chain 34 is wound around the gears 32 and 33 to constitute a power transmission unit.

Further, a speed-increasing gear 35 using a gear is arranged in the middle of the input shaft 31 so that rotating speed of the drum body 2 is increased and transmitted to the input shaft 31 and a rotor (not shown) of the power generator 30 is driven to rotate.

That is, rotating speed of the rotor of the power generator 30 is higher than that of the drum body 2.

Considering specific numerical values, when it is assumed that a flow velocity of the ocean current W is approximately 2 m/second and a diameter of the drum body 2 is 5 m, the number of revolutions of the drum body 2 is (2 m×60)/(the diameter of the drum body 2×3.14)=7.6 (rpm).

Thus, on the assumption that a speed increasing rate of the speed-increasing gear 35 is approximately seven times, it is preferable to adopt a specification in which the number of revolutions of the rotor of the power generator 30 is 50 (rpm) and generated power is 10 V.

Consequently, it is possible to enhance the power utilization efficiency at the time of applying electrolysis to the seawater W having salinity of 3.2% to 3.8%.

It is to be noted that, in the water wheel impeller type power generation device 56, an angle of a linear part from the stopper portion 11 to the fluid receiver portion 12 is 102.27 degrees and an angle θ of the fluid guide plate 24 to the top panel 23 is 30 degrees to 45 degrees or preferably 35 degrees.

A function and an effect of the water wheel impeller type power generation device 56 in the hydrogen energy supply system 51 using ocean current power generation according to this example at the time of power generation using ocean currents will now be described.

The housing 1 is supported by the first float body 52 and arranged in water so that the fluid guide plate 24 faces the flow direction A of the seawater W.

The seawater W led by the fluid guide plate 24 and the seawater W flowing below the fluid guide plate 24 come into contact with the fluid receiver portion 12 of each impeller blade 10 below the rotary shaft 4, and the drum body 2 and the rotary shaft 4 are driven to rotate in an arrow direction B.

The rotation of the rotary shaft 4 is transmitted to the speed-increasing gear 35 and the input shaft 31 through the gears 32 and 33 and the chain 34 to rotate the rotor of the power generator 30, and electric power generated by the power generator 30 is transmitted to the seawater electrolysis device 60 through the power cable 59 and used as a power source of electrolysis to the seawater W.

Furthermore, since the fluid receiver portion 12 is longer and heavier than the stopper portion 11, each impeller blade 10 above the rotary shaft 4 naturally falls under its own weight.

That is, when each impeller blade 10 falls, a fluid receiving area of each impeller blade 10 that receives the fluid becomes extremely small, resistance is decreased on a returning side.

Moreover, when the impeller blade 10 falls, since the fluid receiver portion 12 covers the stopper portion 11 and the lower part of the fluid receiver portion 12 of the subsequent impeller blade 10, the fluid receiver portion 12 abuts on the stopper portion 11. In this regard, the resistance of the impeller blade 10 to the seawater W is reduced on the returning side.

According to the water wheel impeller type power generation device 56, besides the above-described effect, it is possible to provide an effect that mud, sand, garbage, and others in the seawater W are not stored in the drum body 2 including the impeller blades 10 since the fluid guide plate 24 enables the seawater W to flow on the lower side of the drum body 2.

Additionally, since the drum body 2 is formed into a simple shape and the stopper portion 11 and the fluid receiver portion 12 can be formed of the same member, costs of the device can be greatly reduced.

The seawater electrolysis device 60 will now be described with reference to FIG. 7 to FIG. 13.

Figure 7:
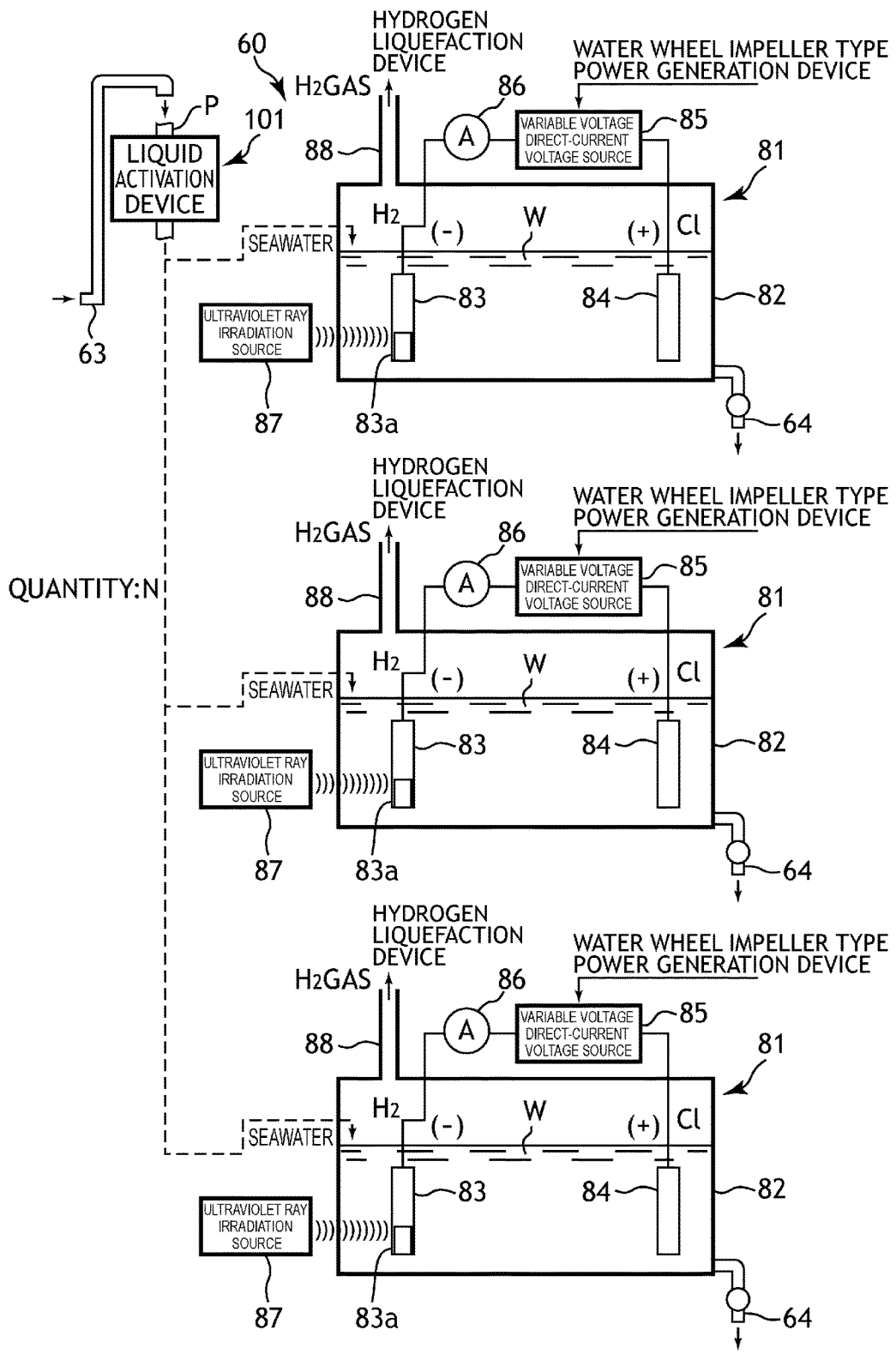
FIG. 7 is a schematic explanatory view showing a conceptual configuration of a liquid activation device and a plurality of electrolyzing means of a seawater electrolysis device in the hydrogen energy supply system using ocean current power generation according to the example.

As shown in FIG. 7, the seawater electrolysis device 60 includes a liquid activation device 101 and a plurality of electrolyzing means 81 for applying electrolysis to the sea water W that is an electrolyte solution as described above.

The liquid activation device 101 will now be described in detail with reference to FIG. 10 to FIG. 13.

Figure 10:
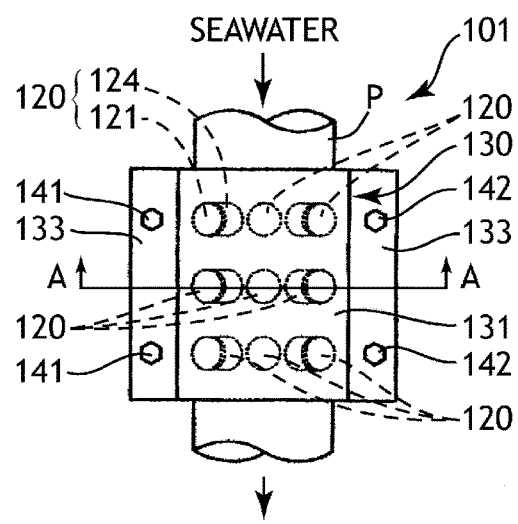
FIG. 10 is a schematic plan view showing the liquid activation device constituting the seawater electrolysis device according to the example.
Figure 11:
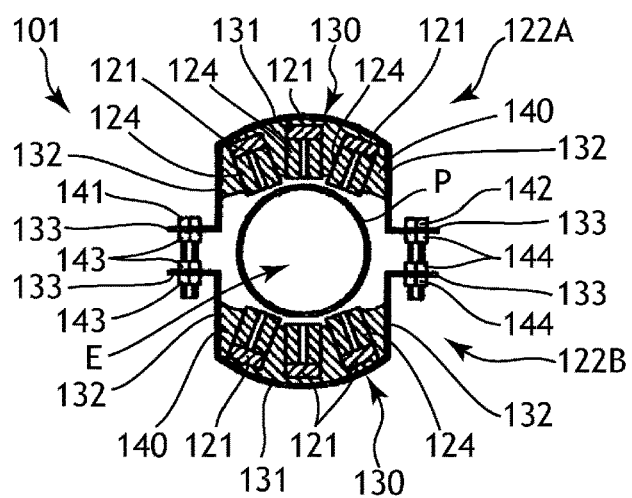
FIG. 11 is a cross-sectional view taken along a line A-A in FIG. 10.

As shown in FIG. 10 and FIG. 11, the liquid activation device 101 includes liquid activators 120 and assemblies 122A and 122B. Each liquid activator 120 includes a black-body radiation sintered compact 121 provided by sintering a plurality of types of metal oxide powder at high temperatures, and an electromagnetic wave convergence body 124 that is provided by laminating a plurality of magnets 123 while alternately arranging N poles and S poles and forming an electromagnetic wave through hole 125 pierced in these laminated magnets 123 and allows electromagnetic waves radiated from the black body radiation sintered compact 121 to pass therethrough while converging them to a fixed wavelength. The assemblies 122A and 122B are integrated in such a manner that the black body radiation sintered compacts 122 are arranged on the outer side whilst the electromagnetic wave convergence bodies 124 are arranged on the inner side and an activation area E where a liquid is activated by the electromagnetic waves is formed on the inner side of the electromagnetic wave convergence bodies 124. The seawater W taken in from the intake port 63 is allowed to pass through a pipe P arranged in the activation area E, and a liquid portion of the seawater (the electrolyte solution) W is activated and supplied to the subsequent electrolyzing means 81.

The liquid activation device 101 will now be described in detail.

The liquid activation device 101 has a pair of assemblies 122A and 122B arranged on an outer circumference of the pipe P.

In the assemblies 122A and 122B, the plurality of liquid activators 120 fixed in covers 130 made of stainless are arranged.

Each cover 130 is formed of an arc-like outer wall portion 131, sidewall portions 132 extended from both side ends of the outer wall portion 131 to the pipe P side, and fixing portions 133 extended from this sidewall portions 132 to the outside of the pipe P at a right angle. The liquid activators 120 are integrally fixed to the covers 130 through an epoxy resin 140.

The assemblies 122A and 122B each having such a configuration are arranged on the outer circumference of the pipe P and integrally arranged with respect to the pipe P by inserting bolts 141 and 142 through the fixing portions 133 and fastening them with nuts 143 and 144.

The liquid activator 120 is constituted of the black body radiation sintered compact 121 that radiates electromagnetic waves and the electromagnetic wave convergence body 124 that converges the electromagnetic waves produced by this black body radiation sintered compact 121 to a specific wavelength.

The black body radiation sintered compact 121 is formed by powdering a plurality of types of metal oxide and sintering them at 1000 to 1400° C.

As starting materials of the metal oxides, the following seven types of starting materials, i.e., cobalt, nickel, manganese, copper, iron, boron, and aluminium are main components. Further, five types of metal oxides selected from neodymium, praseodymium, yttrium, lanthanum, cerium, samarium, europium, gadolinium, terbium, dysprosium, holmium, erbium, thulium, ytterbium, lutetium, and chromium are mixed to the above-described materials, namely, a total of 12 types of metal oxides are mixed and formed.

Figure 12:
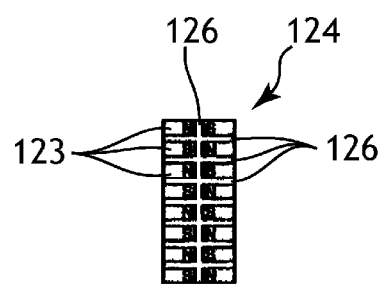
FIG. 12 is a schematic front view showing an electromagnetic wave convergence body of the liquid activation device in the liquid activation device constituting the seawater electrolysis device according to the example.
Figure 13:
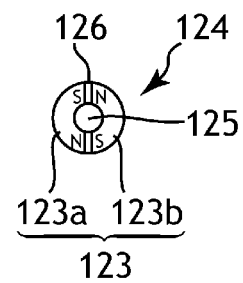
FIG. 13 is a schematic plan view showing the electromagnetic wave convergence body of the liquid activation device in the liquid activation device constituting the seawater electrolysis device according to the example.

As shown in FIG. 12 and FIG. 13, the electromagnetic wave convergence body 124 is formed by splitting a ring-shaped magnet 123 to provide split magnets 123a and 123b and laminating the split magnets 123a and 123b in multiple layers (eight layers in this example).

The magnets 123 have N poles and S poles alternately arranged, and the respective magnets 123 are integrally coupled through each nonmagnetic covering 126.

Consequently, at the center of each electromagnetic wave convergence body 124, the fine electromagnetic wave through hole 125 having a diameter of 1 mm or less is formed.

Electromagnetic waves radiated from the black body radiation sintered compact 121 is allowed to pass through each electromagnetic wave through hole 125 and led to the activation area E of the liquid while being converged.

Besides the above example, although not shown, the electromagnetic wave convergence body 124 may be formed into a structure that planar magnets are laminated in multiple layers (e.g., eight layers) while alternately arranging N poles and S poles, the magnets are integrated with the use of a nonmagnetic covering, and many fine electromagnetic wave though holes having a diameter of 1 mm or less are formed and arranged.

The electrolyzing means 81 will now be described.

First, giving a description on one electrolyzing means 81, as shown in FIG. 7, the electrolyzing means 81 includes an electrolysis container 82 which uses a titanium electrode or a platinum electrode as a negative electrode 83 and a platinum electrode as a positive electrode 84 and in which the seawater W, whose liquid portion has been activated, supplied from the liquid activation device 101 is put, and a variable voltage and direct-current voltage source 85 that applies a variable direct-current voltage (e.g., a direct current of 0 V to 500 V) to the negative electrode 83 and the positive electrode 84, and an ammeter 86 that measures a field electric current.

Further, the electrolyzing means 81 includes an ultraviolet ray irradiation source 87 that irradiates the titanium electrode as the negative electrode 83 with ultraviolet rays to form a titanium oxide layer 83a on an outer surface of the titanium electrode.

Furthermore, electrolysis is applied to the seawater W whose liquid portion has been activated in the electrolysis container 82 while irradiating the negative electrode 83 with the ultraviolet rays from the ultraviolet ray irradiation source 87.

In case of using the titanium electrode as the negative electrode 83, when the titanium electrode is heated and oxidized by a gas burner or the like, the titanium oxide layer 83a is formed on the surface, and irradiating this titanium oxide layer 83a with the ultraviolet rays from the ultraviolet ray irradiation source 87 enables energy of this ultraviolet rays to facilitate electrolysis applied to the seawater W on00 the surface of the titanium oxide layer 83a, thereby increasing an amount of electrolysis.

Since consumption of electric energy (power consumption) at the time of electrolysis can be expressed as (a voltage)×(a current), a starting voltage of electrolysis to the seawater W is considered to be lower than that in a case where no ultraviolet ray is applied.

As described above, when the electrolysis is applied to the seawater W by the electrolyzing means 81, a hydrogen gas (an $H_2$ gas) is generated as a negative electrode reaction on the negative electrode 83 side in the electrolysis container 82.

The generated hydrogen gas is supplied to the subsequent hydrogen liquefaction device 61 through a collecting cylinder 86, liquefied and converted into liquid hydrogen in this device, and further supplied to and stored in the subsequent liquid hydrogen tank 72.

Moreover, the seawater W that has been through the electrolysis performed by the electrolyzing means 81 is discharged into the sea from the drain port 64.

In this example, the same number N (N is a positive integer) (or the number that eliminates the need for frequency adjustment of power generated by each water wheel impeller type power generation device 56) of electrolyzing means 81 in the seawater electrolysis device 60 having the above-described configuration as the water wheel impeller type power generation devices 56 are provided in a one-on-one relationship. For example, 500 electrolyzing means 81 are provided when 500 water wheel impeller type power generation devices 56 are provided, or 100 electrolyzing means 81 are provided when 100 water wheel impeller type power generation devices 56 are provided. It is to be noted that FIG. 7 shows three means alone.

Additionally, one liquid activation device 101 supplies the activated seawater W to the plurality of electrolyzing means 81.

Electrolyzing means 81A having a configuration different from the electrolyzing means 81 in the seawater electrolysis device 60 will now be described with reference to FIG. 8 and FIG. 9.

Figure 8:
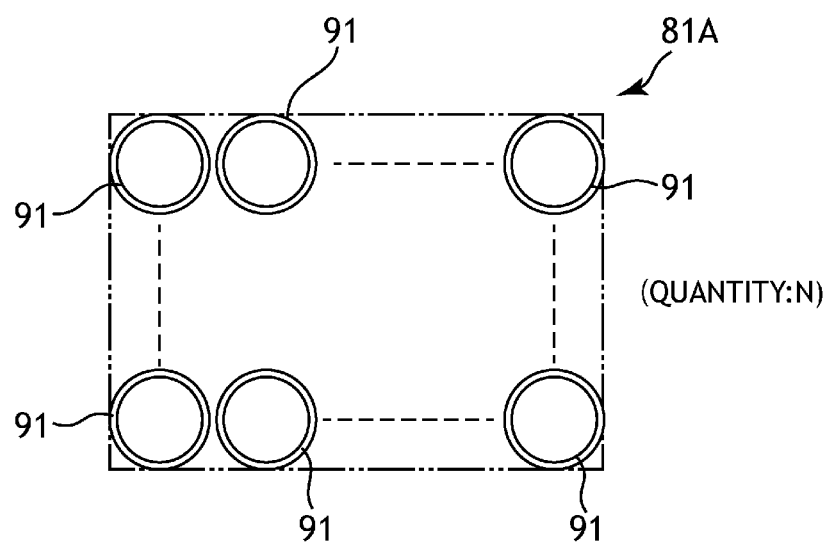
FIG. 8 is a schematic explanatory view showing a structural example of a plurality of other electrolyzing means in the hydrogen energy supply system using ocean current power generation according to the example.
Figure 9:
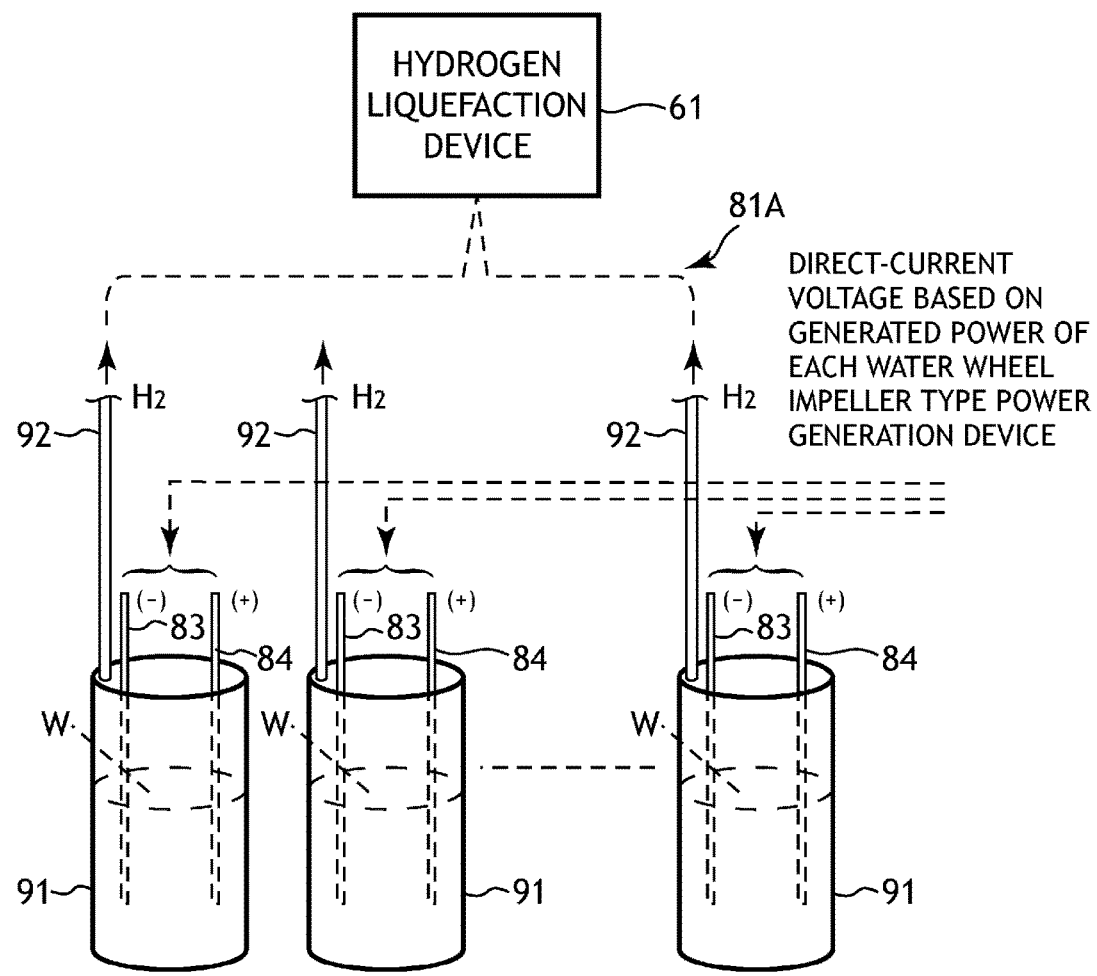
FIG. 9 is a schematic explanatory view showing a hydrogen collection mode of the plurality of other electrolyzing means in the hydrogen energy supply system using ocean current power generation according to the example.

The electrolyzing means 81A shown in FIG. 8 and FIG. 9 is formed by unitizing N small electrolysis cells 91, and configured to convert generated voltages of the respective water wheel impeller type power generation devices 56 into direct-current voltages respectively, apply voltages to the respective negative electrodes 83 and the respective positive electrodes 84 arranged in the seawater W in the respective small electrolysis cells 91, apply electrolysis to the seawater W in the respective small electrolysis cells 91, generate a hydrogen gas (an $H_2$ gas) as a negative electrode reaction on each negative electrode 83 side, collect this hydrogen gas by collecting cylinders 92 arranged in the small electrolysis cells 91 respectively, collectively supply the gas to the subsequent hydrogen liquefaction device 61, liquefy the gas at a low temperature to be converted into liquid hydrogen, and further supply the gas to the subsequent liquid hydrogen tank 72 where the gas is stored.

It is to be noted that FIG. 8 shows an arrangement conformation of the small electrolysis cells 91 alone. Further, in FIG. 8 and FIG. 9, the ultraviolet ray irradiation source 87 is omitted.

When the electrolyzing means 81A including the same number of small electrolysis cells 91 as the plurality of water wheel impeller type power generation devices 56 is provided, a difference between frequencies of power generated by the different water wheel impeller type power generation devices 56 does not have to be adjusted, and the problem of transmission loss does not occur. Furthermore, even if any one of the plurality of the water wheel impeller type power generation devices 56 fails to operate, stopping one small electrolysis cell 91 can suffice, and hence its influence can be suppressed.

Figure 14:
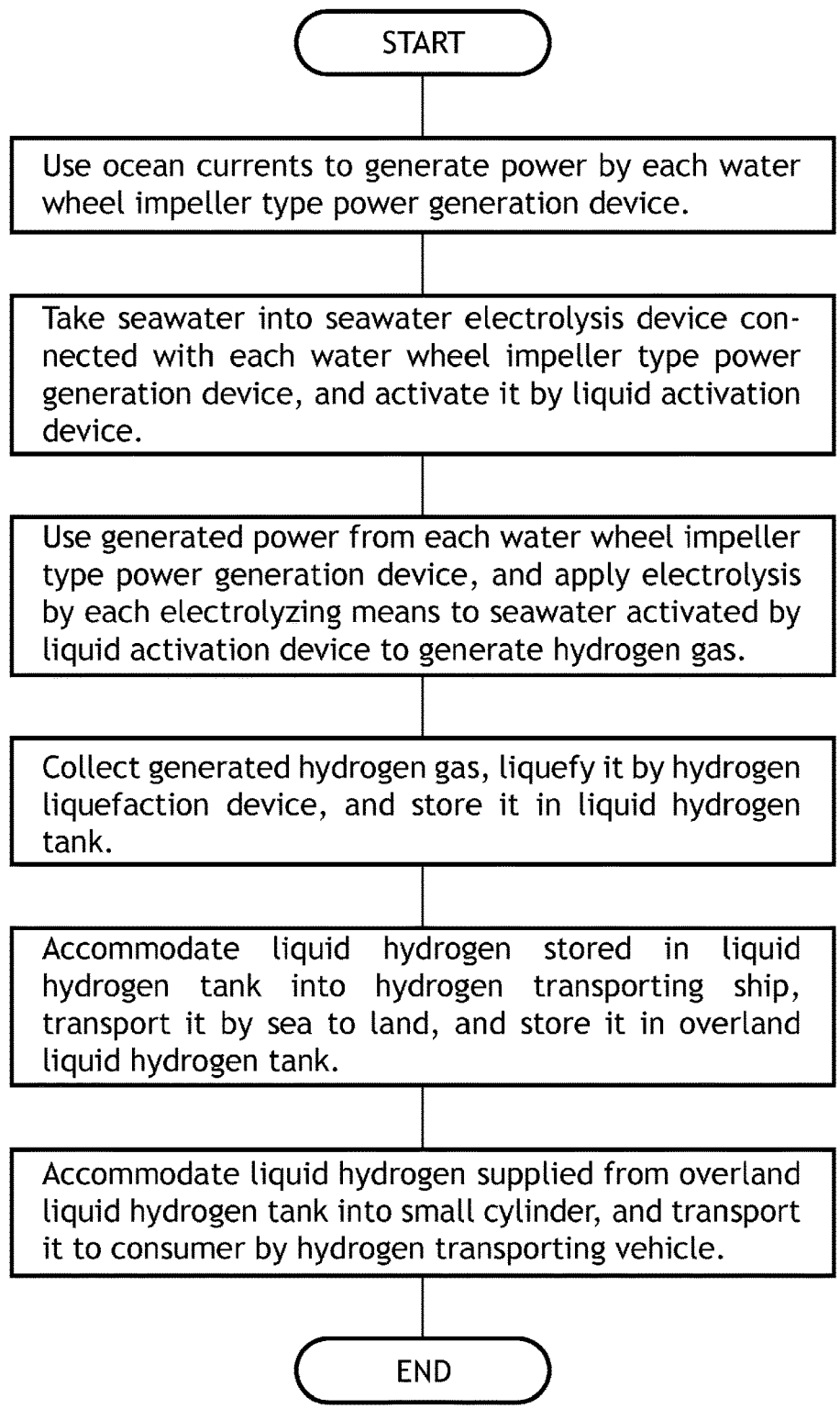
FIG. 14 is a flowchart showing a flow of hydrogen energy supply processing in the hydrogen energy supply system using ocean current power generation according to the example.

FIG. 14 shows a flow of entire hydrogen energy supply processing of the hydrogen energy supply system 1 using ocean current power generation according to this example.

That is, the hydrogen energy supply system 1 using ocean current power generation according to this example generate power by the respective water wheel impeller type power generation devices 56 using ocean currents, takes the seawater W into the seawater electrolysis devices 60 connected with the water wheel impeller type power generation devices 56 respectively, activates the seawater W with the use of the liquid activation device 101 as described above, and supplies the activated water to the respective electrolyzing means 81.

Additionally, each electrolyzing means 81 applies electrolysis to the seawater W activated by the liquid activation device 101 by using generated power from each water wheel impeller type power generation device 56, and a hydrogen gas is generated by a negative electrode reaction.

Then, the generated hydrogen gas is collected and liquefied by the hydrogen liquefaction device 61, and it is stored in the liquid hydrogen tank 62.

Further, the liquid hydrogen stored in the liquid hydrogen tank 62 is accommodated in the hydrogen transporting ship 71, transported by sea, and stored in the overland liquid hydrogen tank 72 arranged on land.

Then, the liquid hydrogen supplied from the overland liquid hydrogen tank 72 is accommodated in the small cylinder 73, transported on land by the hydrogen transporting vehicle 74, and delivered to the consumer 75.

As the consumer 75, there are examples of various factories, stores, general households, and others, and the delivered liquid hydrogen is effectively used as a power generation hydrogen energy source of, e.g., a fuel cell, a hydrogen energy source for a fuel-cell vehicle, and others of the consumer 75.

It is to be noted that a chlorine gas generated simultaneously with the electrolysis applied to the seawater W by the electrolyzing means 81 can be also effectively used.

Figure 15:
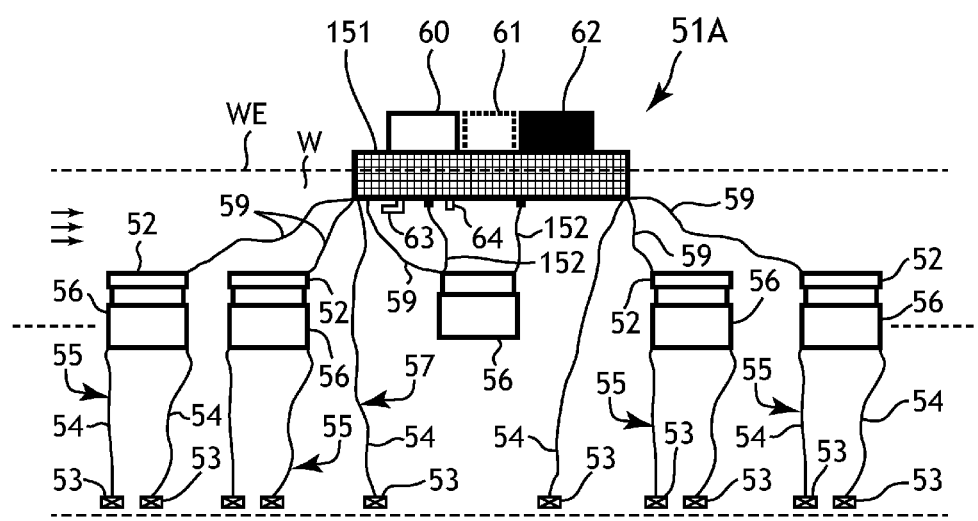
FIG. 15 is a schematic explanatory view showing an entire configuration of a hydrogen energy supply system using ocean current power generation according to a modification of the example of the present invention.

FIG. 15 shows a hydrogen energy supply system 51A as a modification of the hydrogen energy supply system 51 using ocean current power generation according to this example shown in FIG. 1.

In the hydrogen energy supply system 51A as the modification shown in FIG. 15, like reference numerals denote elements equal to those of the hydrogen energy supply system 51 shown in FIG. 1, and a detailed description thereof will be omitted.

The hydrogen energy supply system 51A as the modification shown in FIG. 15 has a structure that a single floating body 151 formed into the same configuration as the second floating body 58 is floated in the sea area WE, a water wheel impeller type power generation device 56 is hung and supported by the floating body 151 with the use of hanging ropes 152, and it is characterized by adding the plurality of water wheel impeller type power generation devices 56 that are supported to float in the sea by a plurality of first floating bodies 52 and moored at the bottom of sea through anchors 55 each including a cone 53 and a mooring rope 54 and use ocean currents to generate electric power.

It is to be noted that FIG. 15 shows the configuration in which the four water wheel impeller type power generation devices 56 are added, but the number of the devices to be installed can be changed to various values, e.g., 100 or 500, and it is not restricted in particular.

Furthermore, FIG. 15 shows the five water wheel impeller type power generation devices 56, the number of the water wheel impeller type power generation devices 56 may be set to 10 or more to be carried out, and the number of the floating bodies to be installed may be increased accordingly.

Other structures are the same as those in the hydrogen energy supply system 51 according to the example shown in FIG. 1.

In case of the hydrogen energy supply system 51A according to the modification, the configuration that the one water wheel impeller type power generation device is hung and supported by the floating body 151 with the use of the hanging rope 152 can be adopted to exercise the same function and effect as those of the hydrogen energy supply system 51 according to the example.

Figure 16:
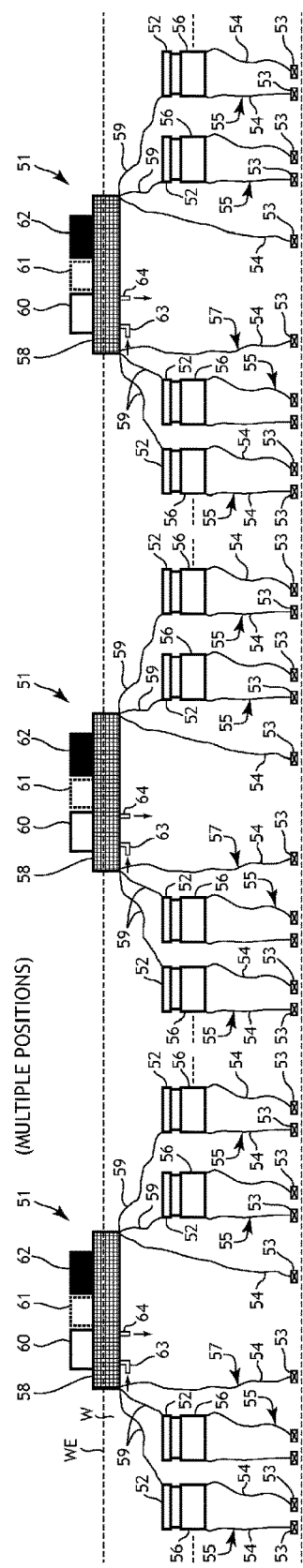
FIG. 16 is a schematic explanatory view showing a state that hydrogen energy supply systems using ocean current power generation according to the example are dispersed and arranged in a sea area.

FIG. 16 shows an example in which respective elements of the hydrogen energy supply system 51 using ocean current power generation according to this example shown in FIG. 1 are dispersed and arranged in the sea area WE at a plurality of positions (FIG. 16 shows three positions only).

It is to be noted that FIG. 16 shows the four water wheel impeller type power generation devices 56 in each hydrogen energy supply system 51, the number of the water wheel impeller type power generation devices 56 may be set to 10 or more, and the number of the floating bodies to be installed may be increased accordingly.

Positions where the dispersedly arranged hydrogen energy supply systems 51 are not restricted in particular, and the systems can be arbitrarily installed at 10 positions, 50 positions, 100 positions, 500 positions, 1000 positions, or the like in accordance with an installation scale, thereby extending the system configuration.

When many hydrogen energy supply systems 51 are dispersed and arranged in this manner, a large amount of liquid hydrogen as hydrogen energy can be provided and delivered to many consumers 75, and it can be effectively exploited.

It is needless to say that dispersing and arranging the plurality of the hydrogen energy supply systems 51A according to the modification in the sea area WE like the case shown in FIG. 16 enables realizing extension of the system configuration and supply of a large amount of the hydrogen energy like the above-described case.

According to the above-described hydrogen energy supply system 51 (or the hydrogen energy supply system 51A) using ocean current power generation according to this example, when the seawater W is efficiently converted into the hydrogen energy with the use of electric energy generated by the water wheel impeller type power generation devices 56 each having the simple configuration using ocean currents and the converted energy is further supplied to the consumer 75 as liquid hydrogen, the excellent effect, i.e., superiority in cost performance as a whole can be exercised without problems of frequency conversion of the generated power or transmission loss.

A hydrogen energy supply system 51B as another modification of the hydrogen energy supply system 51 using ocean current power generation according to this example will now be described with reference to FIG. 17.

Figure 17:
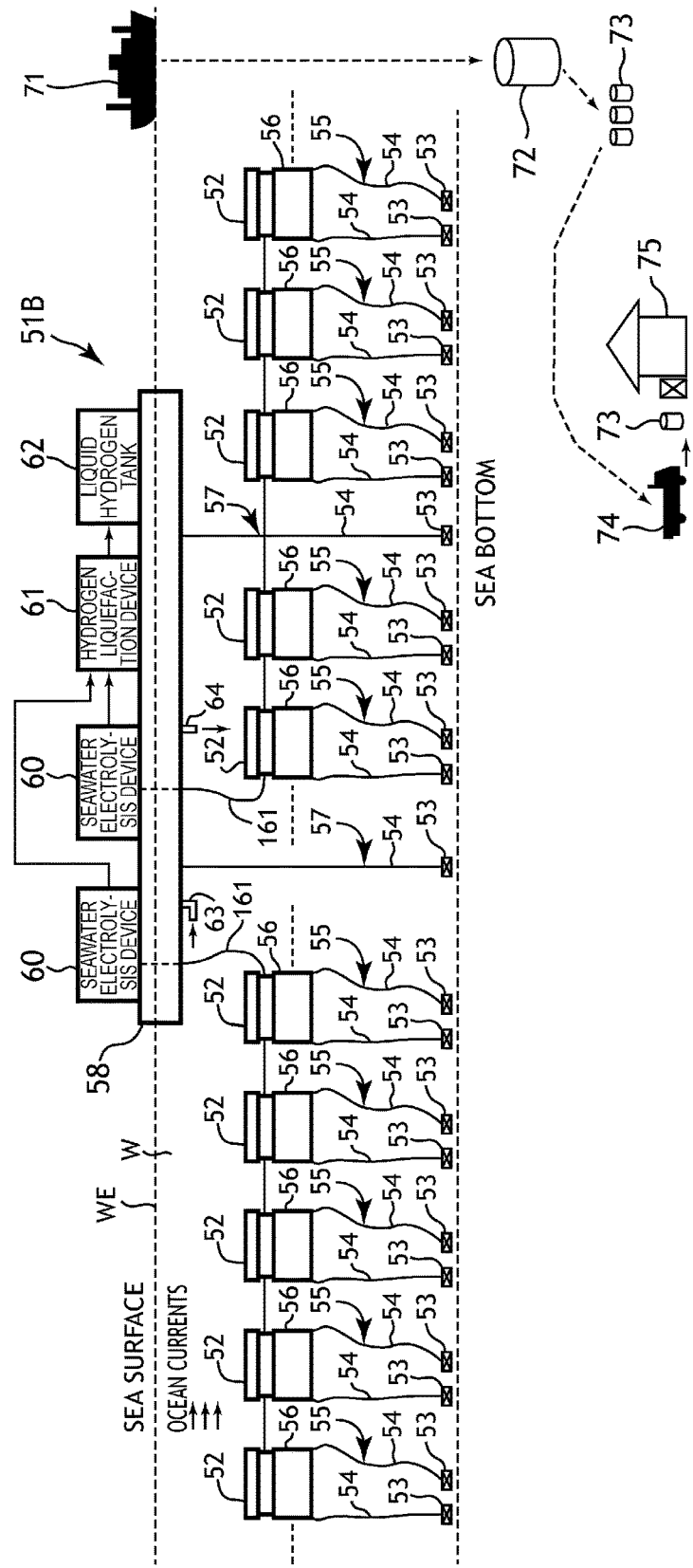
FIG. 17 is a schematic explanatory view showing an entire configuration of a hydrogen energy supply system using ocean current power generation according to another modification of the example of the present invention.

In the hydrogen energy supply system 51B according to another example shown in FIG. 17, like reference numerals denote elements equal to those in the hydrogen energy supply system 51 shown in FIG. 1 and a detailed description thereof will be omitted.

The hydrogen energy supply system 51B according to another modification shown in FIG. 17 has a plurality of (e.g., 10 or more) water wheel impeller type power generation devices 56 that are arranged in the sea of the sea area WE having a high flow velocity of ocean currents, supported to float in the sea by a plurality of (e.g., 10 or more) first floating bodies (floats) 52, moored at the bottom of sea trough anchors 55 each including a cone 53 and a mooring rope 54, and include direct-current power generators that use the ocean currents to generate electric power, a single second floating body (a mega-float) 58 that floats on the sea surface of the sea area WE and is moored at the bottom of sea through, e.g., an anchor 57 including a cone 53 and a mooring rope 54, seawater electrolysis devices 60 arranged on the second floating body 58 each of which includes electric field means 81 that takes in seawater W and applies electrolysis to the seawater W to generate a hydrogen gas by using generated electric power transmitted through power cables 161 along which the respective direct-current power generators of the water wheel impeller type power generation devices 56 are connected in parallel, a hydrogen liquefaction device 61 that converts the generated hydrogen gas into liquid hydrogen under a low-temperature condition of, e.g., −253° C., and a liquid hydrogen tank 62 that stores the liquid hydrogen.

In another modification shown in FIG. 17, the plurality of water wheel impeller type power generation devices 56 each including the direct-current power generator are divided into groups so that five devices form one group on one side and other five devices form one group on the other side, the respective direct-current power generators of the five water wheel impeller type power generators 56 on one side are connected to the first power cable 161 in parallel, electric power is transmitted to the second floating body 58 through this power cable 161, the respective direct-current power generators of the five water wheel impeller type power generators 56 on the other side are likewise connected to the second power cable 161 in parallel, and electric power is transmitted to the second floating body 58 through this power cable 161.

Furthermore, the two seawater electrolysis devices 60, 60 that generate the hydrogen gas based on the electric power transmitted through the two power cables 161 are arranged on the second floating body 58, and the hydrogen gas generated by the two seawater electrolysis devices 60, 60 is supplied to the hydrogen liquefaction device 61.

In addition, it is needless to say that the grouping of the plurality of water wheel impeller type power generation devices 56 is not restricted to the above-described example.

Like the example shown in FIG. 1, the hydrogen energy supply system 51B according to the modification shown in FIG. 17 is configured to include a hydrogen transporting ship 71 that accommodates the liquid hydrogen stored in the liquid hydrogen tank 62 and transports it by sea toward land, an overland liquid hydrogen tank 72 that is arranged on the land to which the hydrogen transporting ship 71 berths and stores the liquid hydrogen supplied from the hydrogen transporting ship 71, small cylinders 73 that accommodate the liquid hydrogen supplied from the overland liquid hydrogen tank 72, and a hydrogen transporting vehicle 74 that transports the small cylinders 73 to various kinds of consumers 75 such as a factory, a general household, or the like on land.

Functions and Effects of the hydrogen energy supply system 51B according to another modification shown in FIG. 17 will now be described.

According to the hydrogen energy supply system 51B, the same effects as those of the hydrogen energy supply system 51 according to the foregoing example are exercised.

Additionally, according to the hydrogen energy supply system 51B, since each water wheel impeller type power generation device 56 in each group includes the direct-current power generator and the respective direct-current power generators are connected to each power cable 161 in parallel, a power transmission system in water can be simplified. Even if one or two water wheel impeller type power generation devices 56 in each group fail to operate or are stopped for maintenance, electric power can be transmitted to the second floating body 58 without obstructing generated power by the remaining water wheel impeller type power generation devices 56, which can contribute to smooth operation of the hydrogen energy supply system 51B without posing a problem for generation of the hydrogen energy.

Further, since the configuration that the respective water wheel impeller type power generation devices 56 are integrated and the generated electric power is collectively transmitted to the second floating body 58 through the power cables 161 is adopted, the number of the seawater electrolysis devices 60 on the second floating body 58 can be reduced to be smaller than the number of the water wheel impeller type power generation devices 56, and the system configuration of the hydrogen energy supply system 51B can be greatly simplified.

INDUSTRIAL APPLICABILITY

The novel and breakthrough hydrogen energy supply system using ocean currents according to the present invention can be very extensively used as a hydrogen energy supply system that take advantage of ocean current energy which is one of natural energies in Japan where the entire circumference of its land area is surrounded by sea.

What is claimed is:

1. A hydrogen energy supply system using ocean current power generation comprising:
   10 or more water wheel impeller type power generation devices that are arranged in water of a sea area where an ocean current flows, supported to float in the water by 10 or more first floating bodies respectively, moored at the bottom of the sea through anchors respectively, and that generate electric power by using the ocean current;
   a second floating body that floats on the sea surface of the sea area and is moored at the bottom of the sea area through anchors having a liquid activation device for activating a liquid portion of the water of the sea area as an electrolyte solution, and uses each generated electric power from the 10 or more water wheel impeller type power generation devices, and has a seawater electrolysis device activated by the liquid portion supplied from the liquid activation device, including an electrolyzing means equal to or smaller than the 10 or more water wheel impeller type power generation devices in number that take in seawater and apply electrolysis to the seawater to generate a hydrogen gas, a hydrogen liquefaction device that converts the hydrogen gas generated by the seawater electrolysis device into liquid hydrogen, and a liquid hydrogen tank that stores the liquid hydrogen arranged thereon;

a hydrogen transporting ship that accommodates the liquid hydrogen stored in the liquid hydrogen tank and transports it by sea toward land;

an overland liquid hydrogen tank that stores the liquid hydrogen supplied from the hydrogen transporting ship;

a cylinder that accommodates the liquid hydrogen supplied from the overland liquid hydrogen tank; and a hydrogen transporting vehicle that transports the cylinder to a consumer side on land;

wherein the seawater electrolysis device comprises:

the liquid activation device comprising:

a liquid activator including a black body radiation sintered body and an electromagnetic wave convergence body using a magnet that allows electromagnetic waves radiated from the black body radiation sintered body to pass while converging them to a fixed wavelength; and assemblies integrated to form a liquid activation area where a liquid is activated by the electromagnetic waves on the inner side of the electromagnetic wave convergence body while arranging the black body radiation sintered body on the outer side and the electromagnetic wave convergence body on the inner side, a liquid portion of the seawater as an electrolyte solution being activated in the liquid activation area; and the electrolyzing means comprises:

an electrolysis container which uses a titanium electrode as a negative electrode and uses a platinum electrode as a positive electrode and in which the seawater that the liquid portion supplied from the liquid activation device is activated—is put; and a variable direct-current voltage source that applies a variable direct-current voltage to the negative electrode and the positive electrode; and an ultraviolet ray irradiation source that irradiates the titanium electrode as the negative electrode with ultraviolet rays to form a titanium oxide layer on an outer surface of the titanium electrode, wherein the electrolyzing means applies electrolysis to the seawater having a liquid portion activated in the activation area to generate a hydrogen gas.

2. The hydrogen energy supply system using ocean current power generation according to claim 1, wherein the 10 or more first floating bodies and the second floating body form one set and one or more sets are arranged in the sea area where an ocean current flows, the 10 or more first floating body having 10 or more water wheel impeller type power generation devices installed in water whose area is 10 times or more larger than a surface area of the second floating body, and the second floating body having the seawater electrolysis device including the electrolyzing means, whose number is equal to that of the liquid activation device and the water wheel impeller type power generation devices or eliminates the need for frequency adjustment, the hydrogen liquefaction device that converts a generated hydrogen gas into liquid hydrogen, and the liquid hydrogen tank that collects and stores the liquid hydrogen arranged thereon.

3. A hydrogen energy supply system using ocean current power generation, comprising:

a floating body that floats on the sea surface of a sea area where an ocean current flows—and is moored at the bottom of the sea area through anchors;

10 or more water wheel impeller type power generation devices that are arranged in water of the sea area where an ocean current flows, supported by 10 or more first floating body to float in water, moored at the bottom of sea through anchors, and use the ocean current to generate the electric power;

a liquid activation device for activating a liquid portion of the water of the sea area as an electrolyte solution, wherein the liquid activation device is disposed on the floating body, and a seawater electrolysis device that uses the generated electric power from the water wheel impeller type power generation device and the 10 or more water wheel impeller type power generation devices supported by the 10 or more first floating bodies, and comprises an electrolyzing means that take in the seawater of the liquid portion supplied from the liquid activation device that is activated, and apply electrolysis to the seawater to generate a hydrogen gas and are equal to or smaller than the water wheel impeller type power generation device in total number, a hydrogen liquefaction device that converts the generated hydrogen gas into liquid hydrogen, and a liquid hydrogen tank that stores the liquid hydrogen, the seawater electrolysis device, the hydrogen liquefaction device, and the liquid hydrogen tank being arranged on the floating body respectively;

a hydrogen transporting ship that accommodates the liquid hydrogen stored in the liquid hydrogen tank and transports it by sea toward land;

an overland liquid hydrogen tank that stores the liquid hydrogen supplied from the hydrogen transporting ship;

a cylinder that accommodates the liquid hydrogen supplied from the overland liquid hydrogen tank; and a hydrogen transporting vehicle that transports the cylinder to a consumer on land;

wherein the seawater electrolysis device comprises:

the liquid activation device comprising:

a liquid activator including a black body radiation sintered body and an electromagnetic wave convergence body using a magnet that allows electromagnetic waves radiated from the black body radiation sintered body to pass while converging them to a fixed wavelength; and assemblies integrated to form a liquid activation area where a liquid is activated by the electromagnetic waves on the inner side of the electromagnetic wave convergence body while arranging the black body radiation sintered body on the outer side and the electromagnetic wave convergence body on the inner side, a liquid portion of the seawater as an electrolyte solution being activated in the liquid activation area; and the electrolyzing means comprises:

an electrolysis container which uses a titanium electrode as a negative electrode and uses a platinum electrode as a positive electrode and in which the seawater that the liquid portion supplied from the liquid activation device is activated—is put;

a variable direct-current voltage source that applies a variable direct-current voltage to the negative electrode and the positive electrode, and an ultraviolet ray irradiation source that irradiates the titanium electrode as the negative electrode with ultraviolet rays to form a titanium oxide layer on an outer surface of the titanium electrode, wherein the electrolyzing means applies electrolysis to the seawater having a liquid portion activated in the activation area to generate a hydrogen gas.

4. The hydrogen energy supply system using ocean current power generation according to claim 3, wherein the water wheel impeller type power generation device, the floating body including the seawater electrolysis device, the hydrogen liquefaction device, and the liquid hydrogen tank, and the first floating body having the 10 or more water wheel impeller type power generation devices arranged thereon are dispersed and arranged at 10 positions or more in the sea area where an ocean current flows.

5. A hydrogen energy supply system using ocean current power generation, comprising:

a floating body that floats on the sea surface of a sea area where an ocean current flows—and is moored at the bottom of the sea area through anchors;

10 or more water wheel impeller type power generation devices that are arranged in water of the sea area where an ocean current flows, supported by a plurality of first floating bodies to float in water, moored at the bottom of the sea through anchors, and includes direct-current power generators that use the ocean current to generate power;

a power cable through which the respective direct-current power generators of the 10 or more water wheel impeller type power generation devices are connected in parallel and which transmits electric power generated by the respective direct-current power generator to the floating body;

a liquid activation device for activating a liquid portion of the water of the sea area as an electrolyte solution, which is disposed on the floating body, and a seawater electrolysis device that is arranged on the floating body, uses the generated electric power through the power cable, and includes electrolyzing means for taking in seawater of the liquid portion supplied from the liquid activation device that is activated, and applying electrolysis to the seawater to generate a hydrogen gas;

a hydrogen liquefaction device that converts the generated hydrogen gas into liquid hydrogen;

a liquid hydrogen tank that stores the liquid hydrogen;

a hydrogen transporting ship that accommodates the liquid hydrogen stored in the liquid hydrogen tank and transports it by sea toward land;

an overland liquid hydrogen tank that stores the liquid hydrogen supplied from the hydrogen transporting ship;

a cylinder that accommodates the liquid hydrogen supplied from the overland liquid hydrogen tank; and a hydrogen transporting vehicle that transports the cylinder to a consumer on land;

wherein the seawater electrolysis device comprises:

the liquid activation device comprising:

a liquid activator including a black body radiation sintered body and an electromagnetic wave convergence body using a magnet that allows electromagnetic waves radiated from the black body radiation sintered body to pass while converging them to a fixed wavelength; and assemblies integrated to form a liquid activation area where a liquid is activated by the electromagnetic waves on the inner side of the electromagnetic wave convergence body while arranging the black body radiation sintered body on the outer side and the electromagnetic wave convergence body on the inner side, the liquid portion of the seawater as an electrolyte solution being activated in the liquid activation area; and the electrolyzing means comprising:

an electrolysis container which uses a titanium electrode as a negative electrode and uses a platinum electrode as a positive electrode and in which the seawater that the liquid portion supplied from the liquid activation device is activated—is put; and a variable direct-current voltage source that applies a variable direct-current voltage to the negative electrode and the positive electrode; and an ultraviolet ray irradiation source that irradiates the titanium electrode as the negative electrode with ultraviolet rays to form a titanium oxide layer on an outer surface of the titanium electrode, wherein the electrolyzing means applies electrolysis to the seawater having a liquid portion activated in the activation area to generate a hydrogen gas.

6. The hydrogen energy supply system using ocean current power generation according to claim 5, wherein the 10 or more water wheel impeller type power generation devices are divided into groups, the power cables that correspond to the groups in number are arranged to transmit the generated electric power to the floating body, and the floating body comprises seawater electrolysis devices that are equal to or smaller than the groups in number.

* * * * *